Nov. 20, 1923.

A. O. GARRETT ET AL 1,474,523

STORAGE BATTERY CELL TOP

Filed Oct. 27, 1920   2 Sheets-Sheet 2

ARTHUR O. GARRETT.  INVENTORS.
CHRISTOPHER E. FUNNELL.
WILLIAM L. HOFFMAN.
BY A.B. Bowman
ATTORNEY Patented Nov. 20, 1923.

1,474,523

UNITED STATES PATENT OFFICE.

ARTHUR O. GARRETT, OF SAN DIEGO, AND CHRISTOPHER E. FUNNELL AND WILLIAM L. HOFFMAN, OF LOS ANGELES, CALIFORNIA.

STORAGE-BATTERY-CELL TOP.

Application filed October 27, 1920. Serial No. 419,839.

*To all whom it may concern:*

Be it known that we, ARTHUR O. GARRETT, CHRISTOPHER E. FUNNELL, and WILLIAM L. HOFFMAN, citizens of the United States, residing at San Diego, Los Angeles, and Los Angeles, respectively, in the counties of San Diego, Los Angeles, and Los Angeles, respectively, and State of California, respectively, have invented a certain new and useful Storage-Battery-Cell Top, of which the following is a specification.

Our invention relates to hard rubber tops for storage battery cells and the objects of our invention are: First, to provide a top made in three parts, portions of said parts being of different width to provide a top for varying width cells; second, to provide a top of this class in which the main or center member is uniform or standard and the auxiliary side members are of different widths; third, to provide a top of this class with means whereby the side members are readily secured and connected to the main central member; fourth, to provide a top of this class with side members having a variety of widths whereby cells of any sizes from 11 to 19 plates may be readily fitted; fifth, to provide a top of this class in which the auxiliary side plates are thicker at the ends so that they are permitted to rest on the shoulders of the plate straps and sixth, to provide a top of this class which is very simple and economical of construction, applicable for use with different width of cells and easy to apply.

Figure 1:
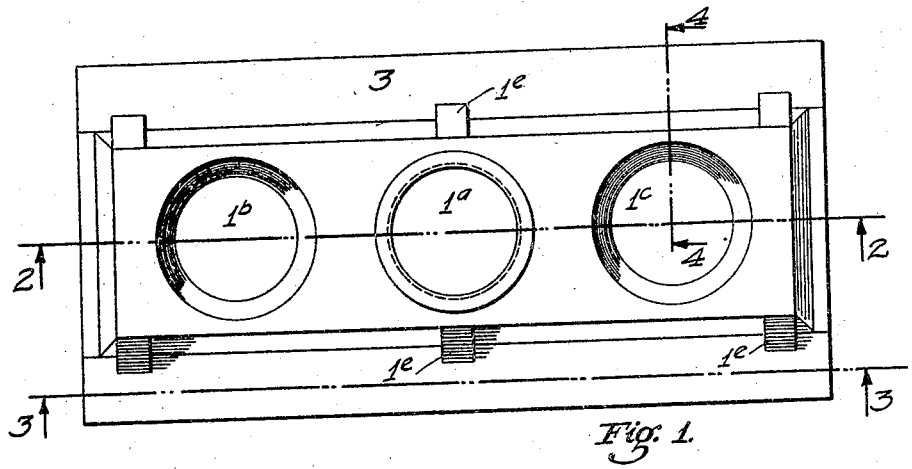
Figure 2:
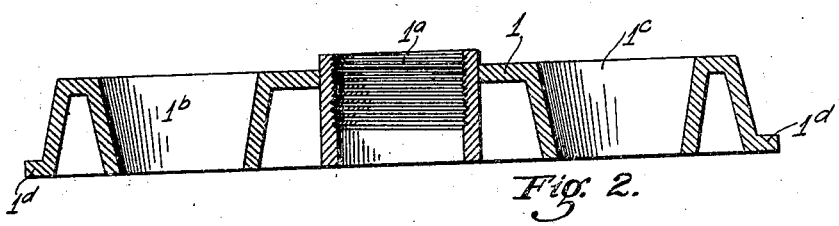
Figure 3:
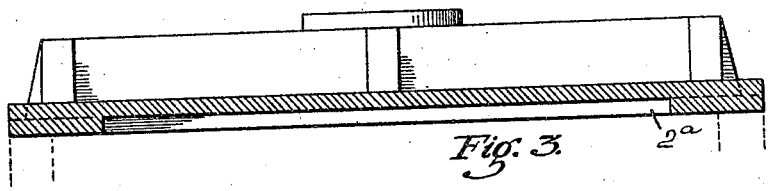
Figure 4:
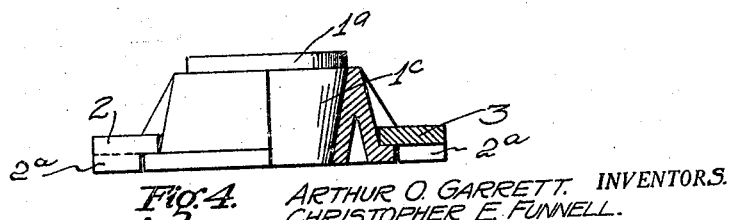
Figure 5:
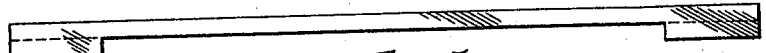
Figure 6:
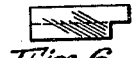
Figure 7:
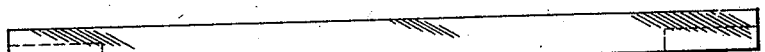
Figure 8:
Figure 9:
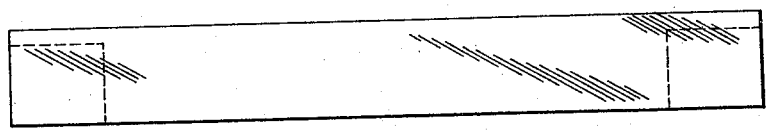
Figure 10:
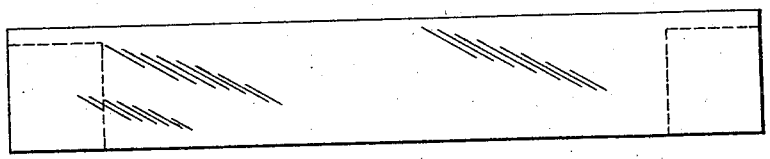
Figure 11:
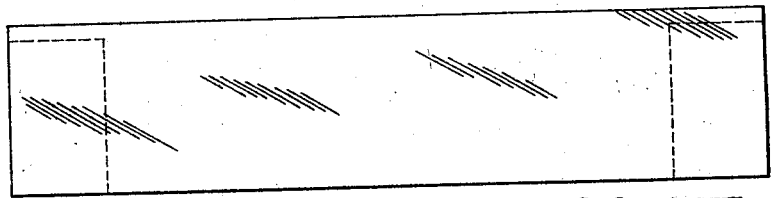

With these and other objects in view as will appear hereinafter our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a top or plan view of one of our battery cell tops; Fig. 2 is a sectional view through 2—2 of Fig. 1; Fig. 3 is a sectional view through 3—3 of Fig. 1; Fig. 4 is a fragmentary sectional view through 4—4 of Fig. 1; Fig. 5 is an edge view of one of the side members; Fig. 6 is an end view thereof and Figs. 7 to 11 inclusive are top views of the various sized members for tops for cells of from 11 to 19 plates.

Similar characters of reference refer to similar parts and portions throughout the several views of the drawings.

The main central member 1 and auxiliary side plates 2 and 3 constitute the principal parts and portions of our storage battery cell tops.

The main central member 1 is a hard rubber member provided with a central hole $1^a$ threaded internally adapted for the plug and is for the purpose of venting and replenishing the cell with water and in each end of this central member 1 are provided openings $1^b$ and $1^c$ adapted for positive and negative terminal posts. It will be noted that the main portion of this central member is raised but that it is provided with a ledge $1^d$ along each edge and positioned at each end and in the middle are lug portions $1^e$, six in number which overhang the ledge and is spaced from the top edge of the ledge a sufficient distance to permit the inner edges of the auxiliary side members 2 and 3 to fit therein as shown best in Figs. 1 and 4 of the drawings. These side members 2 and 3 are hard rubber members provided with downwardly extending end portions $2^a$ which are adapted to rest upon the shoulders of the plate straps. These members 2 and 3 are of varying widths as shown in Figs. 5 to 9 inclusive thus providing for cells with plates from 11 to 19 as desired.

Though we have shown and described a particular construction, combination and arrangement of parts and portions we do not wish to be limited to this particular construction, combination and arrangement but desire to include in the purview of our invention the construction, combination and arrangement substantially as set forth in the appended claims.

It is obvious that with this construction, there is provided tops for cells of various sizes which may be readily applied to the top of the cells; that the side members are supported between the ledge and lugs on the central member for supporting them rigidly, relatively to the center member.

Having thus described our invention what we claim as new and desire to secure by Letters Patent is:

1. A storage battery cell top, including a main one-piece middle member provided with the conventional plate post and filling apertures therein and with laterally extending ledges and extending across the top of the cell longitudinally and covering only a portion of its width and imperforate auxiliary side members provided with an extended ledge portion adapted to engage the opposite side ledges of said middle member and the ledge portion of the same overlap and interlock with said ledge on said middle portion for covering the remainder of the cell top and positioned on opposite sides of said middle member.

2. A battery cell top of the class described including a main one-piece middle member provided with the conventional plate post and filling apertures therein and extending across the top of the cell longitudinally and covering a portion only of its width, a ledge along each side and spaced lugs positioned on opposite sides above said ledges and imperforate auxiliary side members provided with an extended ledge portion adapted to fit between said lugs and said ledge and be locked thereby and cover the remainder of the cell on the opposite sides of said middle member.

In testimony whereof, we have hereunto set our hands at Los Angeles, California this 20th day of October, 1920.

ARTHUR O. GARRETT.
CHRISTOPHER E. FUNNELL.
WILLIAM L. HOFFMAN.